(12) United States Patent
Borio

(10) Patent No.: US 7,758,829 B2
(45) Date of Patent: Jul. 20, 2010

(54) PROCESS FOR PROMOTING MERCURY RETENTION IN WET FLUE GAS DESULFURIZATION SYSTEMS

(75) Inventor: Donald C. Borio, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 12/272,965

(22) Filed: Nov. 18, 2008

(65) Prior Publication Data

US 2009/0148367 A1    Jun. 11, 2009

Related U.S. Application Data

(60) Provisional application No. 60/992,381, filed on Dec. 5, 2007.

(51) Int. Cl.
*B01D 53/64* (2006.01)
(52) U.S. Cl. ...................................... 423/210
(58) Field of Classification Search ................ 423/210
See application file for complete search history.

(56) References Cited

U.S. PATENT DOCUMENTS 5,009,871 A * 4/1991 Higuchi et al. .......... 423/240 R
6,503,471 B1 * 1/2003 Han et al. .................. 423/210
2002/0102189 A1 * 8/2002 Madden et al. ............ 422/168
2004/0202596 A1   10/2004 Honjo et al.
2006/0029532 A1 * 2/2006 Breen et al. ................ 423/210
2007/0154373 A1   7/2007 Johnson et al.

FOREIGN PATENT DOCUMENTS

| DE | 4315138 C1 | 7/1994 |
| DE | 19801321 A1 | 7/1999 |
| DE | 19850054 A1 | 5/2000 |
| DE | 102004044291 A1 | 3/2006 |
| EP | 0235414 A1 | 9/1987 |
| EP | 0782472 B1 | 12/1998 |
| EP | 1972369 A2 | 9/2008 |

OTHER PUBLICATIONS

PCT International Search Report and The Written Opinion of the International Searching Authority dated Feb. 5, 2009-(PCT/US2008/084461).

* cited by examiner

*Primary Examiner*—Timothy C Vanoy
(74) *Attorney, Agent, or Firm*—Rita D. Vacca

(57) ABSTRACT

A system and method is proposed for removing mercury from a process gas stream containing mercury. The proposed invention provides for contacting an aqueous desulphurization liquor with a flue gas stream to capture mercury that may be contained in the flue gas stream. A promoter is mixed with the liquor to prevent oxidized mercury in the liquor from reducing into elemental mercury.

10 Claims, 7 Drawing Sheets

PROCESS FOR PROMOTING MERCURY RETENTION IN WET FLUE GAS DESULFURIZATION SYSTEMS

CROSS REFERENCE TO RELATED APPLICATION(S)

This application claims priority to copending U.S. provisional application entitled, "Process for Promoting Mercury Retention in Wet Flue Gas Desulfurization Systems", having U.S. Ser. No. 60/992,381 filed on Dec. 5, 2007, the disclosure of which is entirely incorporated herein by reference.

FIELD OF THE INVENTION

The proposed invention relates to a system and method for removing mercury from a process gas stream containing mercury. More particularly, the proposed invention is directed to a flue gas processing system for removing $CO_2$ from a flue gas stream. The proposed invention provides for contacting an aqueous desulphurization liquor with a flue gas stream to capture mercury that may be contained in the flue gas stream. A promoter is mixed with the liquor to prevent oxidized mercury in the liquor from reducing into elemental mercury.

SUMMARY OF THE INVENTION

Embodiments of the present invention provide a system and method for removing mercury from a process gas stream. Briefly described, in architecture, one embodiment of the system, among others, can be implemented so as to include a reaction vessel configured to receive a flue gas stream containing mercury and an aqueous liquor supply; and liquid to gas mass transfer device disposed within the interior of the reaction vessel.

Embodiments of the present invention can also be viewed as providing a method for removing mercury from a flue gas stream. In this regard, one embodiment of such a method, among others, can be broadly summarized by the following steps: contacting an aqueous liquor with a flue gas stream containing mercury; and mixing the aqueous liquor with an oxidizer to prevent oxidized mercury contained in the aqueous liquor from being reduced to elemental mercury.

Other systems, methods, features, and advantages of the present invention will be or become apparent to those with ordinary skill in the art upon examination of the following drawings and detailed description. It is intended that all such additional systems, methods, features, and advantages be included within this description, be within the scope of the present invention, and be protected by the accompanying claims.

BACKGROUND

Removal of mercury from the flue gas streams emitted from, for example, fossil fuel fired boilers/boiler systems, is becoming a goal for industries to meet by way of mandate of environmental laws. Various systems and methods have been proposed to remove mercury from gas streams, such as flue gas streams. Most of these known systems and methods attempt to use, to some extent, existing pollution control equipment designed for removal of elemental/chemical components and particle matter other than mercury.

Wet flue gas desulfurization (WFGD) systems/methods are known. These systems and methods are typically employed to remove sulfur oxides from the flue gas stream emitted from, for example, coal fired boilers/boiler systems. These systems do not remove or attempt to remove mercury from the flue gas stream. Given the environmental regulatory climate and the general public demand for a cleaner environment, the future points to the need for and implementation of many more of these WFGD systems to accommodate the anticipated (increased) number of industrial and power generation facilities that will incorporate fossil fuel fired boilers/boiler system. These WFGD systems are not inexpensive to construct or operate.

Given the costs associated with implementing flue gas processing systems and equipment, it would be desirable to have a single gas processing system that could remove more than a limited number of pollutants from a flue gas stream. Thus, a heretofore unaddressed need exists in the industry to address the aforementioned deficiencies and inadequacies.

Further, features of the present invention will be apparent from the description and the claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. The invention will now be described in more detail with reference to the appended drawings in which.

DISCUSSION

The proposed invention is directed to a system and method for removing at least a portion of mercury from a flue gas stream that contains mercury. If mercury can be captured by these WFGD systems, then a potentially large capital and operating cost savings can be realized relative to installing new equipment dedicated solely to mercury removal.

Figure 1A:
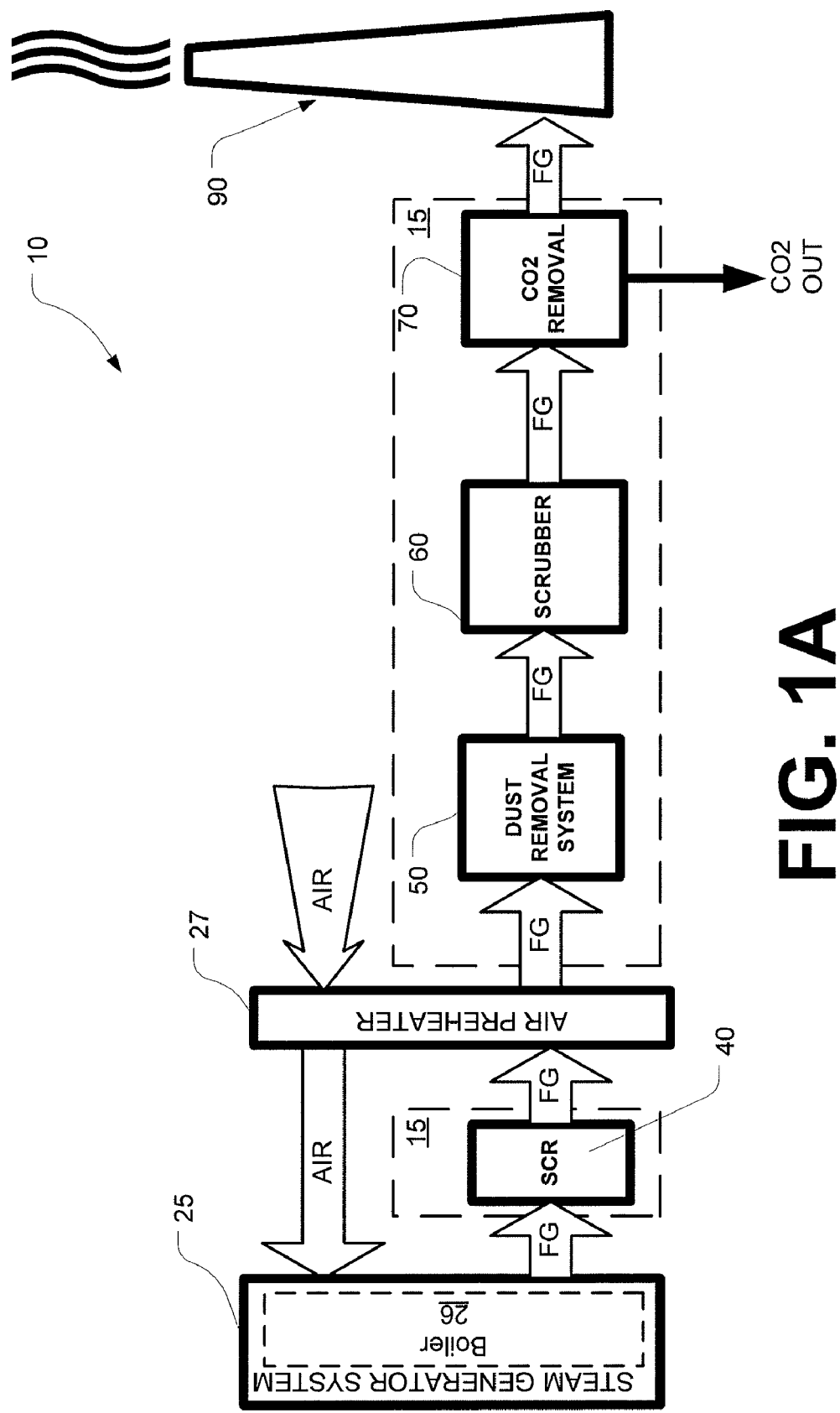
FIG. 1A is a diagram generally depicting a typical flue gas processing system.

FIG. 1A is a diagram generally depicting a flue gas processing system 15 for use in removing various pollutants from a flue gas stream FG emitted by the combustion chamber of a boiler system 26 used in a steam generator system of, for example, a power generation plant 25. This system 15 includes a selective catalytic reduction (SCR) system 40 configured to remove nitrogen oxides from the flue gas stream, dust removal system 50 configured to remove particulate matter from the flue gas stream, a scrubber system 60 configured to remove sulfur oxides, including sulphur dioxide ($SO2$) and sulphur trioxide ($SO3$), from the flue gas stream FG and a $CO2$ removal system 70 that is configured to remove $CO2$ from the flue gas stream FG before emitting the cleaned flue gas stream to an exhaust stack 90 (or alternatively additional processing). The scrubber system 60 may be, for example a wet flue gas desulphurization (WFGD) system.

Figure 1B:
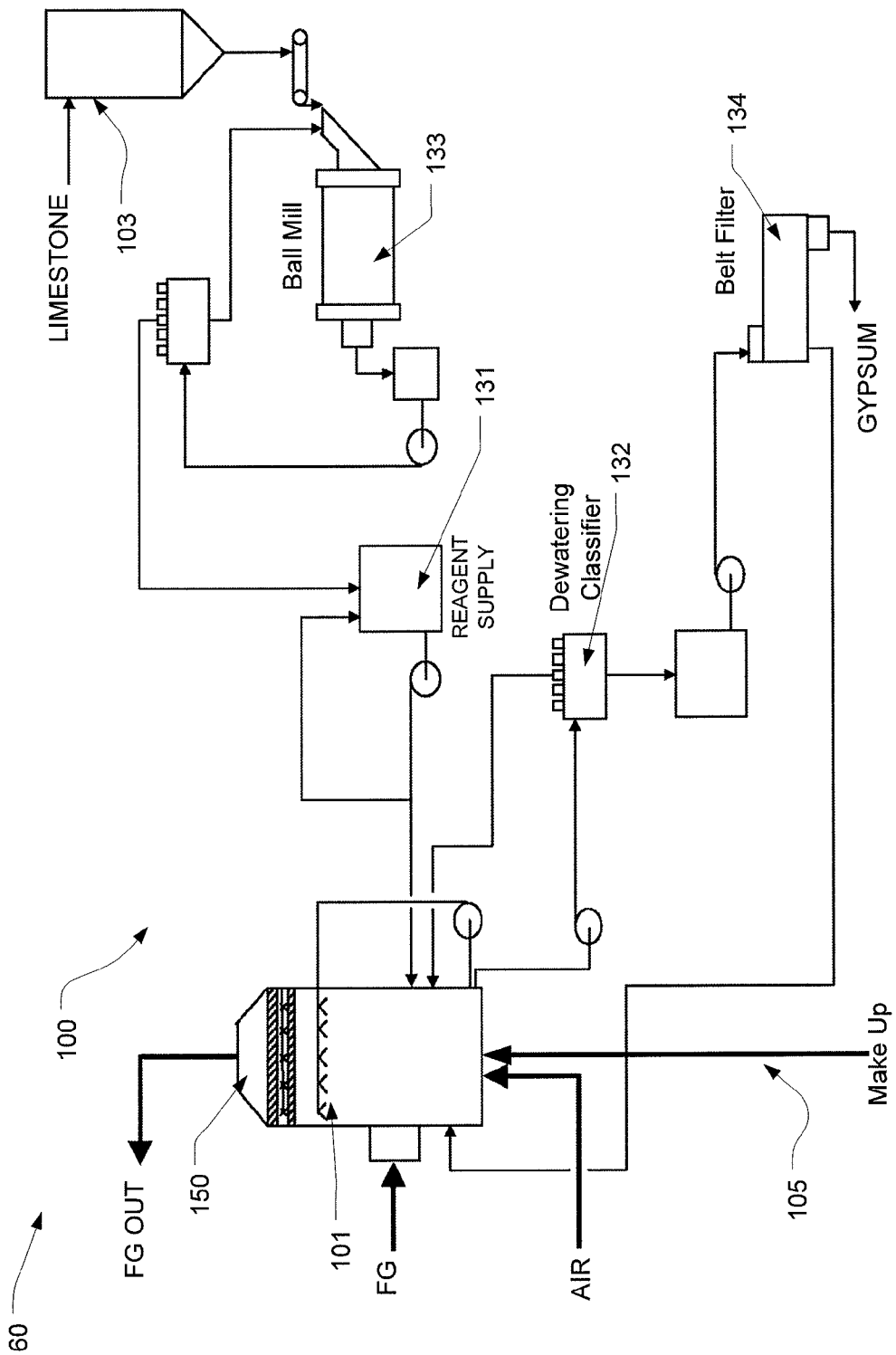
FIG. 1B is a diagram generally depicting details of a wet flue gas desulphurization system (WFGD) 100.

FIG. 1B is a diagram generally depicting a scrubber system 60 that includes a wet flue gas desulphurization system (WFGD) 100. The WFGD 100 includes a desulphurization reaction vessel (reaction vessel) 150. The reaction vessel 150 includes one or more spray head devices and/or piping systems 101 for spraying an aqueous desulphurization liquor (liquor) into the interior of the reaction vessel 150. A reagent supply tank 131 is provided for storing the reagent. A limestone supply 103 is provided to serve as the reagent. A ball mill 133 is provided and configured to grind the limestone to a desired size/level of fineness. The reaction vessel 150 is configured to receive a flue gas stream (FG), as well as an air supply (AIR) and a make up water supply 105. The desulphurization liquor may contain, for example, water and a reagent of some type. The reagent may be, for example, lime or limestone.

Mercury in the flue gas generated from the combustion of coal typically exists in two primary general forms—elemental mercury and oxidized mercury (both in gaseous states). Oxidized mercury exists as a compound in which the mercury is combined with another element, typically chlorine, in the flue gas. Elemental mercury is that mercury which is uncombined with another element.

Oxidized mercury may be effectively captured in WFGD systems while elemental mercury can not. In the flue gas leaving the combustion chamber of, for example, a coal-fired boiler, the majority of the mercury contained in the flue gas (up to approximately 90%) is in the elemental form while only about 10% is oxidized.

After the portion of oxidized mercury in the flue gas has been increased by an effective method, such as, for example, the addition of calcium bromide or via subjecting the flue gas stream to processing via a selective catalytic reaction (SCR) system or NOx removal system, oxidized mercury can be very easily absorbed by the liquor of a WFGD system. However, the oxidized mercury absorbed by the liquor is unstable and will typically be reduced to elemental mercury in the WFGD liquor and re-emitted to the atmosphere.

This reduction process is influenced by the specific chemical species in the liquor and the physical conditions in the WFGD reaction vessel, such as temperature and static pressure. Sulfite ion ($SO_3^-$) is postulated to be a key factor in reducing the previously captured/absorbed oxidized mercury back to its elemental state ($Hg^°$). While the majority of sulfite ions are removed from the water portion of the liquor via the WFGD system/process through forced air oxidation to sulfate ($SO_4^-$) ions in the system reaction tank, a small portion of sulfite ions (soluble sulfite in the water portion of the liquor) remains in the liquor and may be sufficient to reduce the mercury to its elemental form.

In order to capture mercury that may be contained in a process gas stream, such as, for example, a flue gas stream, a system and method is proposed in which a wet flue gas desulphurization (WFGD) system is configured to receive an oxidizer and mix it with a desulphurization liquor (liquor) that is supplied to the WFGD system.

The desulphurization liquor is typically composed of suspended solids and dissolved solids. The suspended solids may include, for example, lime and/or limestone, calcium sulfate, calcium sulfite, coal ash, and limestone impurities. The dissolved solids may include calcium, magnesium, sodium, potassium, sulfate, sulfite, carbonates, chlorides, and flourides. The desulphurization liquor is typically contacted with a flue gas stream via a liquid to gas mass transfer device(s) contained within the interior of, for example, a WFGD reaction vessel. By contacting the desulphurization liquor with the flue gas stream, $SO2$ and $SO3$ contained in the flue gas stream may be captured/removed from the flue gas stream (FG). Other gases that may be contained in the flue gas from fossil fuel fired boilers/boiler systems and removed by the desulphurization liquor may include, for example, hydrogen chloride and hydrogen fluoride. In addition, the oxidized mercury contained in the flue gas is removed by the desulphurization liquor.

The proposed invention provides for an oxidizer to be introduced into the system 200 and used in conjunction with a desulphurization liquor to oxidize any sulfites that may remain in the WFGD reaction vessel 150 after air oxidation to sulfates. The oxidizer is preferably a strong oxidizer, such as, for example, such as hydrogen peroxide ($H_2O_2$). In this way, the specie which acts to reduce mercury may be removed.

The oxidizer may be introduced into the typical WFGD system 200 via several ways, including, but not limited to introducing the oxidizer into the WFGD reaction vessel directly. This may be accomplished via pumping the strong oxidizer from a strong oxidizer storage tank and into the WFGD reaction vessel via one or more sprayer devices. It may also be directly mixed with the desulphurization liquor and introduced into the WFGD reaction vessel as a combined mixture. Further, it may be introduced into the WFGD reaction vessel 150 collection area toward the bottom 151 of the WFGD reaction vessel 150 where desulphurization liquor sprayed into the vessel collects prior to be pumped out of the vessel for regeneration and recirculation in the WFGD system. The strong oxidizer may be mixed with the desulphurization liquor at any other location/point within the WFGD system in which the oxidizer can ultimately be transported and mixed with/into the desulphurization liquor.

Figure 2A:
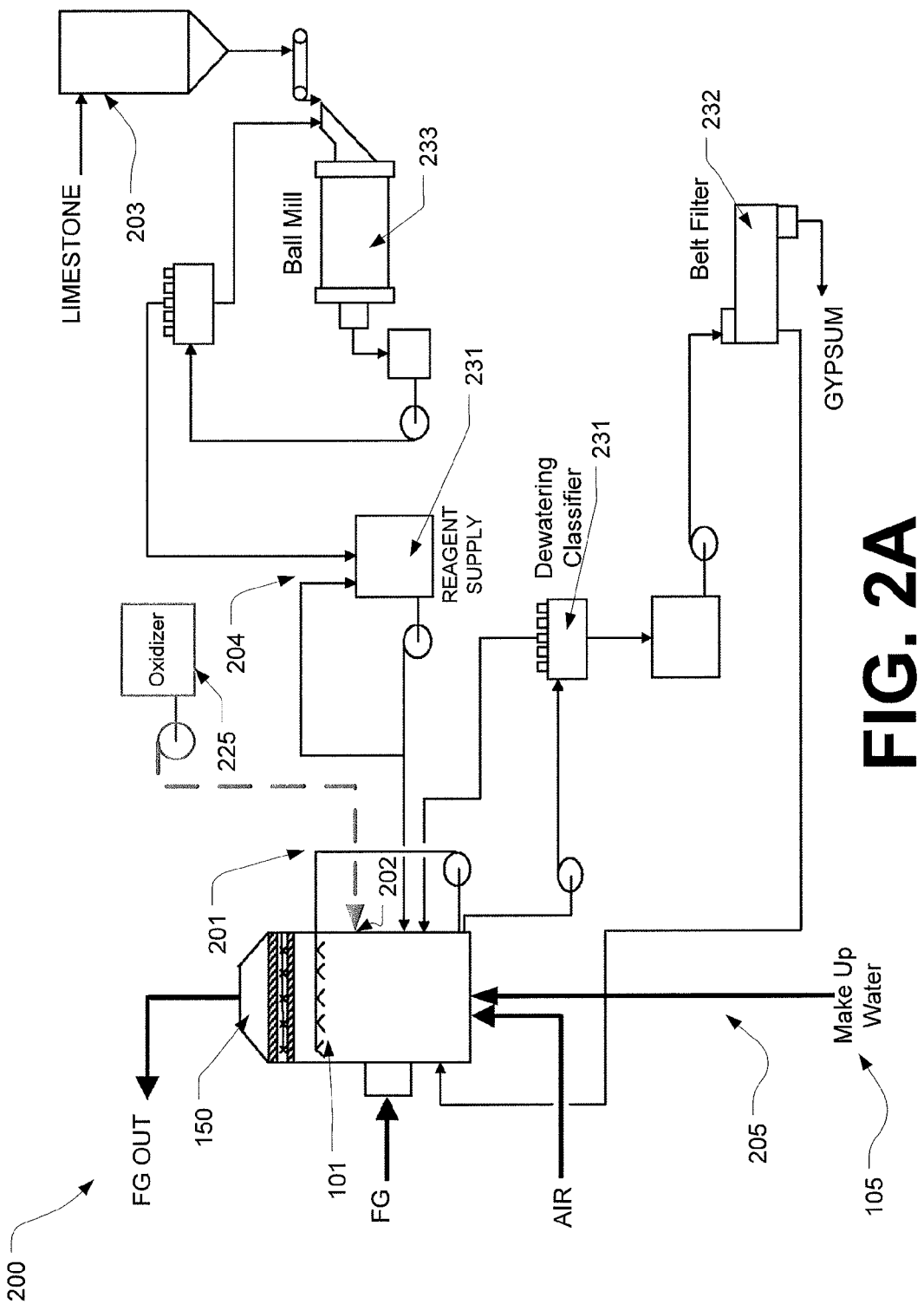
FIG. 2A is a diagram generally depicting one embodiment of a WFGD configured to remove mercury from a flue gas stream (FG) wherein an oxidizer is provided to the reaction vessel 150 via a designated inlet.

FIG. 2A depicts an example of one embodiment of a Wet Flue Gas Desulfurization (WFGD) System 200 that includes provisions for introducing a oxidizer 225 into the system 200 in a manner that will allow it to be mixed with the desulphurization liquor. In this example, the oxidizer is provided to the reaction vessel 150 via a designated inlet 202 so that it is combined with the desulphurization liquor used to contact flue gas stream FG. The liquor may also include other dissolved compounds and suspended solids. The suspended solids may be a mixture of undissolved limestone plus the products of the reaction between the liquor and the chemicals/chemical components in the flue gas stream (reaction products)—mainly calcium sulfate (gypsum).

The oxidizer does not need to contact the flue gas, it only needs to end up in the absorber reaction tank. The oxidizer does not oxidize the mercury which has been oxidized in the flue gas by another means. It is provided to oxidize any sulfite ions that may be contained in the WFGD reaction tank 150 to sulfate. Sulfite is a potential cause for the reduction of oxidized mercury resident in the reaction vessel back in to elemental mercury. The proposed invention is directed to decreasing this reduction of oxidized mercury resident in the reaction vessel back to elemental mercury by minimizing the amount of sulfite in the reaction vessel. This is accomplished via the addition of an oxidizer. The liquor containing the oxidized mercury may then be disposed of as is typical with standard WFGD systems.

Strong oxidizers other than hydrogen peroxide may also be used. The proposed system and method can be used to prevent mercury reduction in WFGD systems in the absence of flue gas mercury oxidation promoters, or in combination with, or in addition to, known methods of flue gas mercury oxidation enhancement. The proposed system may be used to process flue gas from any type of combustion chamber, whether fired via coal, gas, oil or other means.

The oxidizer 225 may be introduced to the system 200, for example, via the spray head 101 (201); and/or via direct introduction into the reaction vessel 150 (202); and/or, via introduction into/with the limestone 103 input (203); and/or, via introduction into/with the reagent supply (204) and/or via introduction into/with the make-up water 105 (205). It will be recognized that the strong oxidizer may be introduced into the system 200 at other points or via other means and still achieve the intended results contemplated herein.

Figure 2B:
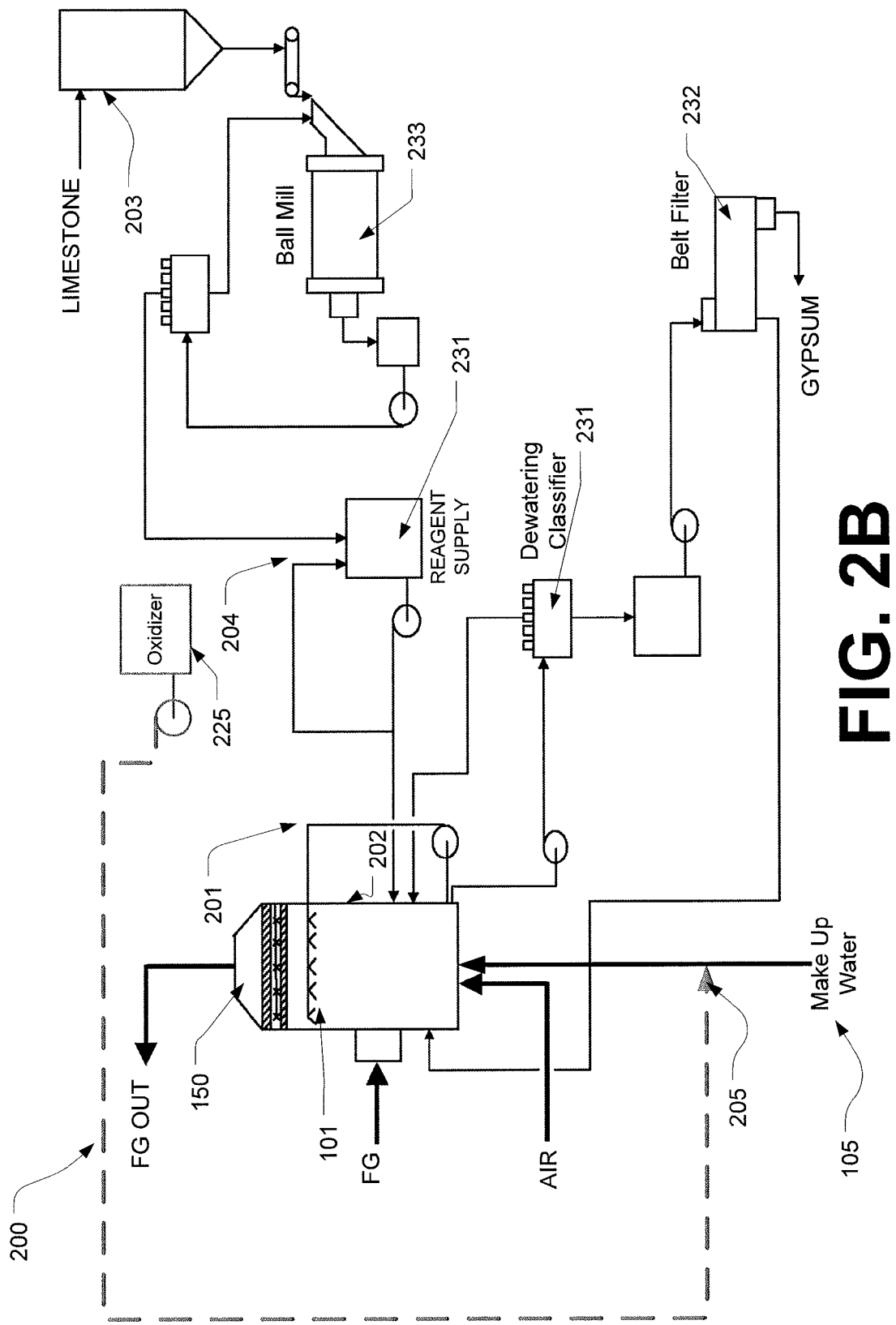
FIG. 2B is a diagram generally depicting one embodiment of a WFGD configured to remove mercury from a flue gas stream (FG) wherein an oxidizer is provided to the reaction vessel 150 via mixing it with make up water supply.

FIG. 2B depicts an example of a further embodiment of a Wet Flue Gas Desulfurization (WFGD) System 200 wherein an oxidizer is introduced to the system 200 via providing an oxidizer to the reaction vessel 150 via mixing it (205) with a make up water supply 105.

Figure 2C:
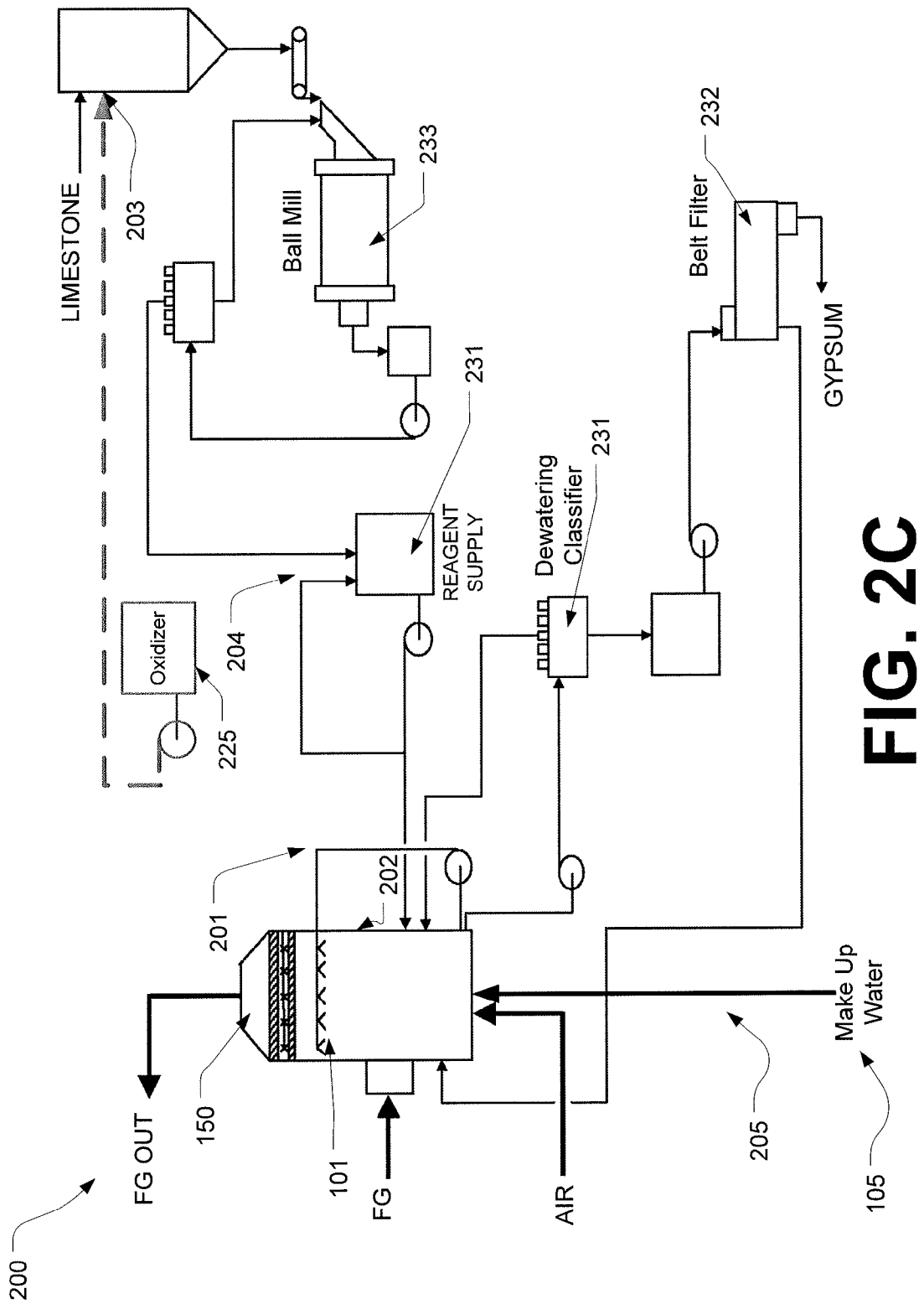
FIG. 2C is a diagram generally depicting one embodiment of a WFGD configured to remove mercury from a flue gas stream (FG) wherein an oxidizer is provided to the reaction vessel 150 via mixing it with a limestone supply that is used in the reagent.

FIG. 2C depicts an example of a further embodiment of a Wet Flue Gas Desulfurization (WFGD) System 200 wherein an oxidizer is introduced to the system 200 via providing an oxidizer to the reaction vessel 150 via mixing it with a limestone supply that is used in the reagent supply used for the liquor.

Figure 2D:
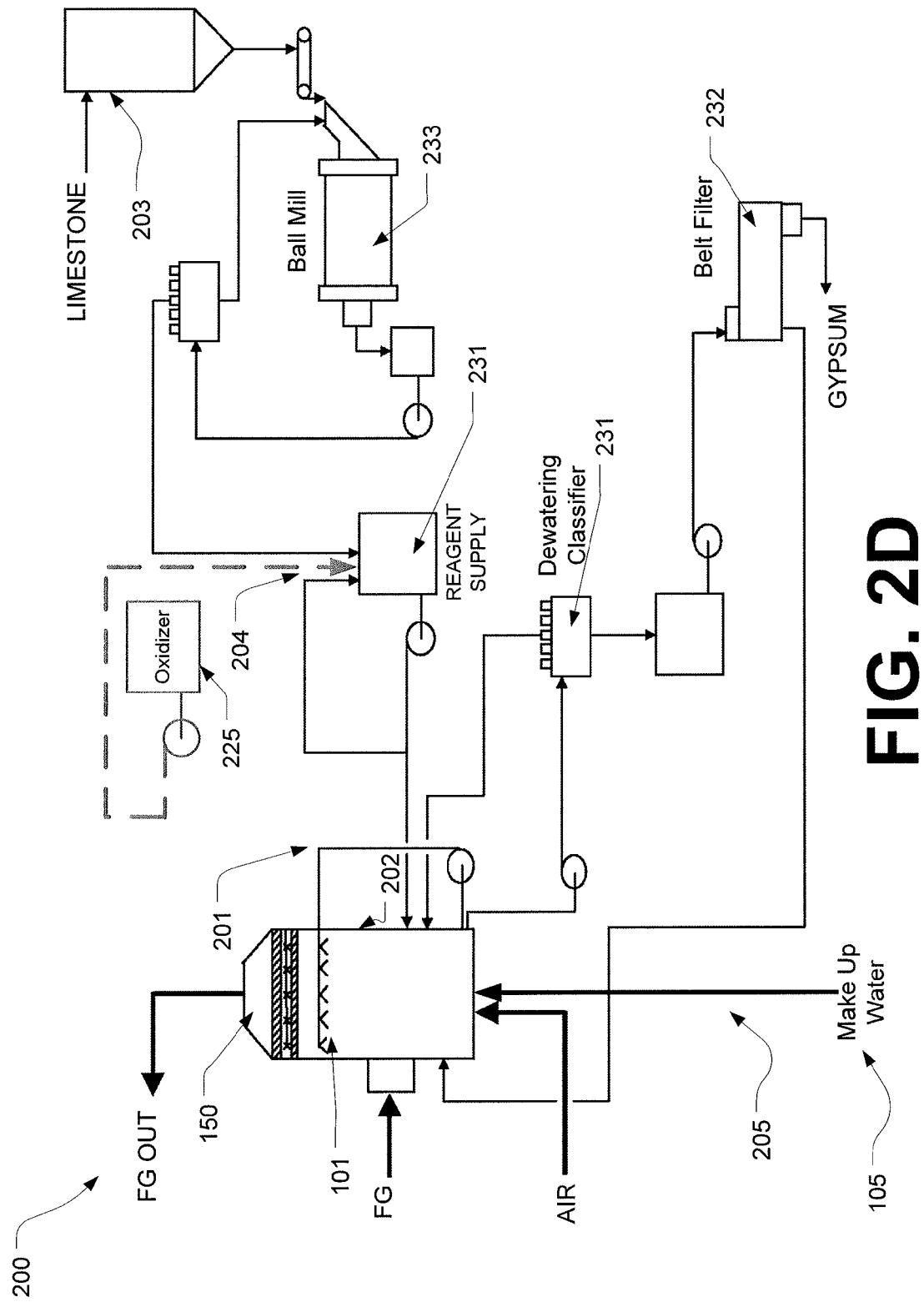
FIG. 2D is a diagram generally depicting one embodiment of a WFGD configured to remove mercury from a flue gas stream (FG) wherein an oxidizer is provided to the reaction vessel 150 via mixing it with a reagent supply.

FIG. 2D depicts an example of a further embodiment of a Wet Flue Gas Desulfurization (WFGD) System 200 wherein an oxidizer is introduced to the system 200 via providing an oxidizer to the reaction vessel 150 via mixing it with a reagent supply.

Figure 2E:
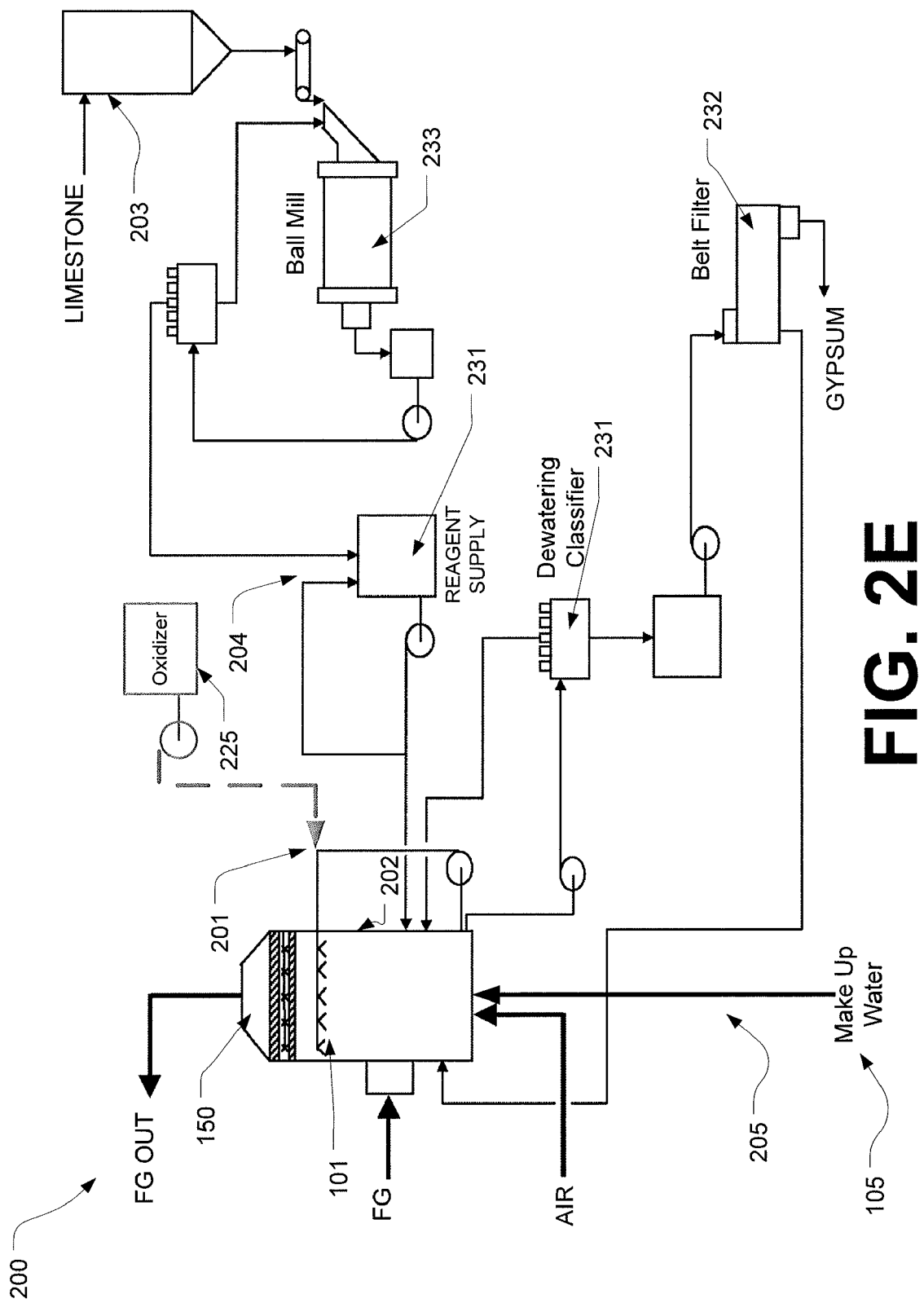
FIG. 2E is a diagram generally depicting one embodiment of a WFGD configured to remove mercury from a flue gas stream (FG) wherein an oxidizer is provided to the reaction vessel 150 via a sprayer system.

FIG. 2E depicts an example of a further embodiment of a Wet Flue Gas Desulfurization (WFGD) System 200 wherein an oxidizer is introduced to the system 200 via providing an oxidizer to the reaction vessel 150 via wherein an oxidizer is provided to the reaction vessel 150 via a sprayer system.

FIG. 2A-FIG. 2D depict several possible means of introducing the strong oxidizer into the system so that it might be combined with the absorbent slurry. Any one or all, or a combination, of these means may be implemented to introduce the strong oxidizer into the system 200 so that it can be combined with the desulphurization liquor. Further, the oxidizer may be introduced into the system 100 via other points/ means not specifically shown here and still achieve the intended results contemplated herein.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed:

1. A method of removing mercury from a flue gas stream, the method comprising the steps of:
    contacting in a scrubbing tower an aqueous liquor with a flue gas stream containing mercury; and
    mixing in a scrubbing tower the aqueous liquor with an oxidizer to prevent oxidized mercury contained in the aqueous liquor from being reduced to elemental mercury.

2. The method of claim 1 wherein the aqueous liquor comprises water and a reagent.

3. The method of claim 2 wherein the reagent comprises lime.

4. The method of claim 2 wherein the reagent comprises limestone.

5. The method of claim 1 wherein the oxidizer comprises a strong oxidizer.

6. The method of claim 5 wherein the strong oxidizer comprises hydrogen peroxide ($H_2O_2$).

7. The method of claim 1 wherein the oxidizer comprises hydrogen peroxide ($H_2O_2$).

8. A method of removing mercury from a flue gas stream, the method comprising the steps of:
    contacting in a scrubbing tower an aqueous liquor with a flue gas stream containing mercury to remove mercury from the flue gas stream; and
    mixing in a scrubbing tower the aqueous liquor with an oxidizer to prevent oxidized mercury contained in the aqueous liquor from being reduced to elemental mercury.

9. The method of claim 8 wherein the oxidizer comprises a strong oxidizer.

10. The method of claim 9 wherein the strong oxidizer comprises hydrogen peroxide ($H_2O_2$).

\* \* \* \* \*